United States Patent [19]
Van Laar et al.

[11] 3,805,466
[45] Apr. 23, 1974

[54] METALLURGICAL SHAFT FURNACE LINED BY REFRACTORY ELEMENTS AND FILLER SPACERS

[75] Inventors: Jacobus Van Laar, Santpoort; Leo E. F. Van Basten Batenburg, Castricum, both of Netherlands

[73] Assignee: Koninklijke Nederlandsche Hoogovens en Staalfabrieken N.V., Ijmuiden, Netherlands

[22] Filed: May 2, 1972

[21] Appl. No.: 249,647

[30] Foreign Application Priority Data
May 3, 1971  Netherlands ...................... 7106028

[52] U.S. Cl. .................... 52/249, 52/396, 52/573, 110/1 A, 110/1 B
[51] Int. Cl. ...................... F27d 1/04, F27b 14/00
[58] Field of Search ............ 52/245, 249, 573, 747, 52/396, 403, 562, 232; 264/30; 110/1 A, 1 B, 1 C; 161/168; 156/89; 106/99

[56] References Cited
UNITED STATES PATENTS

| | | | |
|---|---|---|---|
| 3,560,164 | 2/1971 | Vernable | 110/1 A |
| 3,315,950 | 4/1967 | Potocnik et al. | 110/1 A X |
| 3,398,945 | 8/1968 | Walpole | 264/30 |
| 3,346,248 | 10/1967 | Martinet et al. | 52/573 X |
| 1,099,559 | 6/1914 | Machalske | 110/1 C |
| 2,454,922 | 11/1948 | Hite | 52/747 X |
| 2,912,740 | 11/1959 | Berry | 52/249 X |
| 617,930 | 1/1899 | Kennedy | 52/249 X |
| 3,366,375 | 1/1968 | Jones | 52/573 X |
| 2,818,248 | 12/1957 | Kelsey | 52/245 X |
| 3,658,633 | 4/1972 | Jumentier | 161/168 |
| 1,851,038 | 3/1932 | Clark | 106/99 |

*Primary Examiner*—Henry C. Sutherland
*Attorney, Agent, or Firm*—Hall & Houghton

[57] ABSTRACT

In the formation of the lining of a metallurgical or like furnace wall construction, the wall construction lining is formed from the furnace bottom upwardly by alternating layers of refractory block elements and filler plates which are softened by heat over a temperature range of several hundred degrees centigrade. The total thickness in a vertical direction of filler plates employed in the wall lining will generally equal the total thermal expansion vertically of the refractory block elements employed in forming the furnace wall lining, this thermal expansion being from the bottom point at which a filler plate is employed to a top point or layer at which a filler plate is employed. The thermal expansion herein referred to is the expansion from the cold condition of the furnace wall lining to a temperature level of lining of the furnace wall construction of 50° to 300°C below the temperature level during normal operation.

2 Claims, 1 Drawing Figure

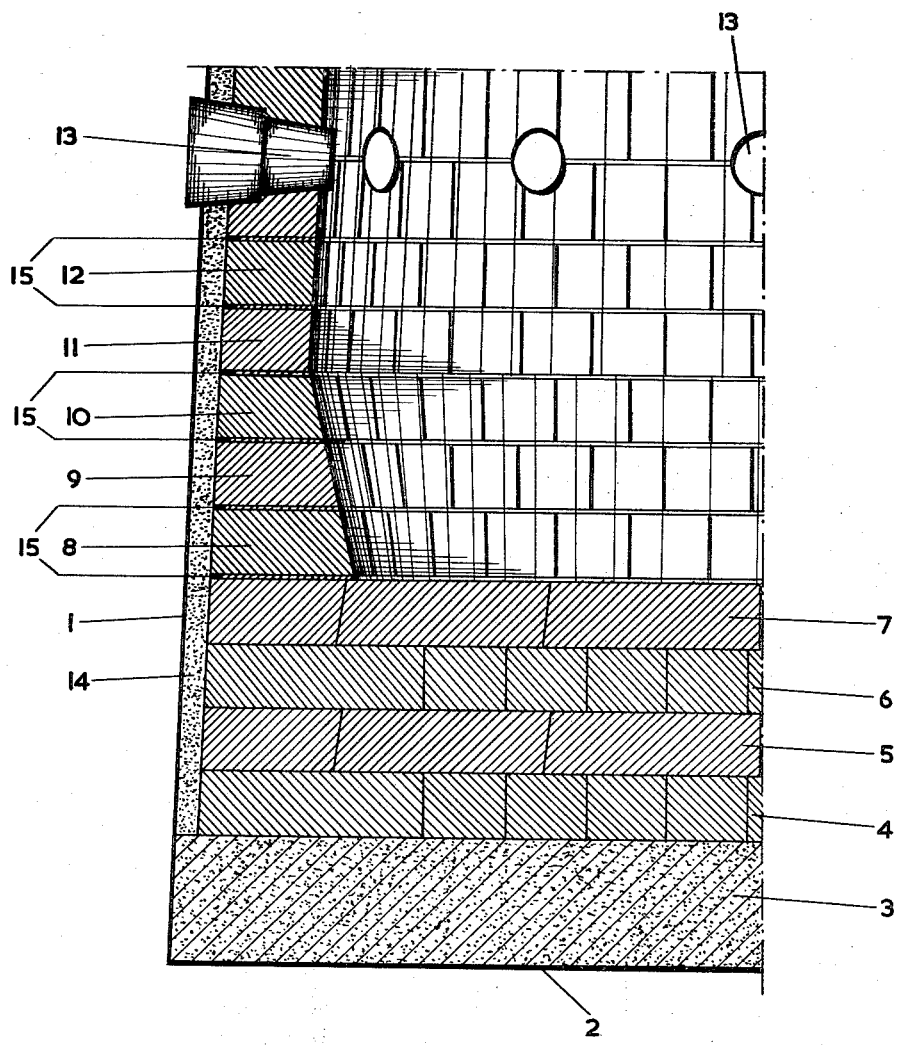

METALLURGICAL SHAFT FURNACE LINED BY REFRACTORY ELEMENTS AND FILLER SPACERS

A method for the lining of substantially vertical wall parts of furnaces, in contact with a liquid, with refractory elements, in particular for lining a metallurgical shaft furnace, in which wall parts of the furnace, joining a furnace bottom built up of refractory elements, are also lined with refractory elements.

The invention also relates to metallurgical shaft furnaces, lined in this way, and in particular to a blast furnace for iron ore reduction.

The invention will be explained in more detail with reference to a method for lining such a blast furnace wall. It will however be clear that the invention is not restricted to this application, but that it is also advantageously applicable to the refractory lining of many other types of furnaces, metallurgical ones and others.

When heating up a blast furnace the temperature of the refractory lining increases, and at the inner side of this lining it reaches values which correspond to the temperatures prevailing within the furnace, i.e., to about 1400°C for liquid iron. Thereby the refractory lining has the tendency to dilate thermally. The bottom of the furnace will also increase in temperature and will thus also tend to increase in thickness and thus to push the lining of the wall in an upward direction.

In many cases the furnace wall will, however, be constructed in such a way that the refractory lining cannot freely expand upwardly. Particularly in the case of a blast furnace several elements penetrating through the furnace wall, such as the row of tuyeres and the iron tap holes will constitute an obstruction to such upward expansion of the lining. This entails that the lining of the wall will be submitted to high compression forces. In smaller furnaces this pressure is responsible for a good sealing of the furnace lining without giving harmful effects. However, it has appeared that for larger furnaces, such as for the present day blast furnaces of increasing dimensions and of higher output, the said thermal dilatation of the refractory wall lining will give serious problems. There is particularly the danger of crushing of the refractory elements from which the lining of the wall is built up. This crushing, which is due to the high local compression stresses, may give a considerable shortening of the useful lifetime of the furnace lining.

As the refractory elements are piled one upon the other, it is impossible or very difficult to obtain a solution by using dilatation joints between the elements stacked upon one another. It is in theory imaginable that the refractory elements would be provided with upper and lower surfaces which are somewhat inclined or bevelled, so that in cold condition there are free joints between the stacked refractory elements, which are wider at the inside and decrease in width towards the outside. If dimensioned and shaped properly such a solution would give a possibility of dilatation which for any zone corresponds to the real dilatation occuring during the heating up. In practice, however, it has not appeared possible to embody the inner wall of the furnace at an acceptable price in such a way. Moreover there is the danger that the joints will not close entirely, so that liquid metal will be able to penetrate outwardly between the bricks, also as a result of the high pressures, which prevail in the concerning zones in the lower part of the furnace.

In view of the above the present invention is based upon a totally novel idea for avoiding the occurrence of high compression stresses in the lining of the wall.

The invention consists in that, at least in the inner layer of the wall lining, part of the refractory elements is stacked while alternating with filler plates, which filler plates soften over a temperature range of several hundreds degrees C, and in which the total thickness of the filler plates situated one above the other, as measured in the vertical direction, corresponds to the thermal expansion in a vertical sense of the inner side of the corresponding part of the wall lining in the same zone between two vertically spaced points at which vertical expansion is restrained, one point above and one point below said filler plates, said thermal expansion being the expansion from cold condition to a temperature level of the lining at the furnace side or inner side of about 50 percent to 300°C below the operating temperature level.

In particular the invention relates to such a method in which the total vertical thickness of filler plates positioned one above the other in the manner as given above corresponds to the thermal expansion in the vertical sense of the furnace bottom and of the inner side of the said part of the wall lining extending from said bottom to the higher expansion restraining means for this lining in the furnace wall.

With such a method it is attainable that refractory elements with parallel upper and lower surfaces can easily be stacked with the interposition of flat filler plates. Such filler plates in cold condition of the furnace and also during the beginning of the heating up thereof form a structural element of the furnace lining. As the furnace is heated to increasing temperatures, the filler plates begin to soften gradually from the inner or furnace side to the outside, so that they give space for expansion or dilatation to the refractory elements of the lining. Simultaneously, however, the filler plates at the side away from the inside of the furnace maintain their supporting function. If the furnace has reached the final temperature level for operation, the refractory elements at the furnace or inner side form a continuous surface without open joints therebetween. Thereto it is necessary that the total possibility of expansion is already taken up (with the filler plates softened and pressed out) before the final temperature level of the furnace is reached and to this end the invention proposes to reach this condition of closing of the joints at a temperature which is about 50° to 300°C below the operating temperature of the furnace. In that situation it is quite possible that at the side remote from the inside of the furnace there are remaining parts of the filler plates still present for support.

It is important for the new method according to the invention that the filler plates do not soften abruptly, which might cause a collapse of the refractory lining. It has appeared that good results may be obtained if according to the invention the filler plates consist of a laminated composite material, the several layers of which have softening ranges within temperature intervals being mutually apart. In particular it has appeared advantageous if one layer softens between 200° and 600°C and a second layer between 600° and 1100°C. More particularly it appears to be preferable according to the invention of the first layer consists of a glass mat and the second layer of a layer of asbestos fibres. It is of course also possible to build up the filler plates from more than two layers, in which glass fibres and asbestos fibres alternate.

As has already been remarked, the softening filler plates in some cases have to give space for the expansion both of the bottom of the furnace and of the refractory wall lining up to the tuyeres or tap holes in the furnace wall. In practice it has appeared that this possibility of expansion can usually be obtained if according to the invention the filler plates have a thickness of up to about 0.4 percent of the height of the refractory wall elements. In particular this is the case when using carbon bricks.

It has appeared that the gradual softening from the inside to the outside of the layers of the filler plates entails that the filler plates give freedom to thermal expansion over a long temperature range and moreover give sufficient support for the wall lining. In this respect it has appeared according to the invention to be quite favourable if the outer layer of the refractory lining, bordering a metal outer wall, consists of graphite. Thereby this layer remains quite cool and thus gives an additional safety against the penetration of liquid iron through the wall.

As has already been remarked the invention not only relates to the method for the lining of furnace walls, but also to metallurgical shaft furnaces lined in this way, and in particular to blast furnaces for iron ore reduction. It has appeared that in blast furnaces lined in this way the danger of local crushing of the wall lining is entirely avoided, so that this refractory lining has a much longer operative life time.

The invention will now be explained in more detail with reference to the enclosed drawing which diagrammatically in vertical section shows part of the wall of the hearth and the bottom of a blast furnace. As this structure, apart from tap holes, is symmetrical around the vertical axis, only the left side of the hearth and bottom has been shown.

Reference numeral 1 indicates a steel jacket and numeral 2 a bottom plate for the blast furnace. On the steel bottom plate bottom layers 3 to 7 inclusive have been built up. On bottom layer 7 the wall lining is built up from refractory blocks in layers 8 to 12 inclusive. The upper layer 12 is enclosed by a row of wind openings (tuyeres) 13, which open into the furnace in different radial positions around the furnace and which are secured to the steel jacket 1. Between the layers 8 to 12 inclusive and the steel jacket 1, there is layer of graphite material, 14.

The blocks of layers 8 to 12 inclusive each have a thickness of about 60 cm. Between these blocks there are filler plates 15 with a thickness of about 2.0 mm. These filler plates are built up of two layers, a layer of a glass fibre mat and a layer of asbestos fibres. It is unimportant whether one or the other of these layers is on top.

The hearth wall lined in this way appears to have a much longer life time than usual hearth walls, and after cooling of the wall, when taking such a furnace out of operation, it appears that the inner surface of the lining facing the inside of the furnace has not been crushed at all, which is true for all of the layers 8 to 12 inclusive.

If the iron tap hole, not shown, also is a non-movable structure rigidly connected to the steel jacket 1, it is necessary to take up the expansion of the bottom in a vertical sense separately in the zone below this tap hole. As a rule this is only possible with the aid of one single filler plate between the bottom and the first wall layer 8.

The expansion between the tap hole and the wind holes (tuyeres) should in that case be taken up locally separately by filler plates.

It is further remarked that it is not attractive to apply horizontal dilatation joints or filler plates between the bottom layers, as these would constitute an obstruction for the heat flow through the bottom.

We claim:

1. A metallurgical furnace comprising a furnace bottom construction and a refractory wall construction extending upwardly therefrom, said refractory furnace wall construction including a plurality of refractory block elements laid one upon the other in a vertical direction forming a lining for said wall construction and a filler plate positioned between a plurality of each of said vertically laid refractory block elements forming alternating layers of refractory block elements and filler plates at least adjacent the bottom structure, said filler plates consisting of one layer of a glass fibre mat and another layer of asbestos fibres, one of said layers softening between 200° and 600°C and the other of said layers softening between 600° and 1100° C, the total thickness of said filler plates employed, as measured in the vertical direction, corresponding to the total thermal expansion vertically of the inner side of the corresponding part of the wall lining formed by the refractory blocks in the same zone extending between two vertically spaced points within which vertical expansion will occur, one point being above and one point below the top and bottom filler plates used, said thermal expansion being the expansion from cold condition to a temperature level of the wall lining of about 50° to 300°C below the temperature level of the lining during normal operation.

2. A furnace in accordance with claim 1, wherein said furnace wall construction includes air holes spaced above said furnace bottom and the wall lining between said air holes and said furnace bottom being formed of said alternating layers of refractory block elements and filler plates, said filler plates having a total sum thickness of up to about 0.4 percent of the total sum thickness of the refractory block elements positioned between the furnace bottom and the air holes.

* * * * *